US006973024B1

(12) United States Patent
Joseph et al.

(10) Patent No.: US 6,973,024 B1
(45) Date of Patent: Dec. 6, 2005

(54) METHOD FOR MODEM ELEMENT SWITCHOVER USING MULTICAST GROUPS

(75) Inventors: Boby Joseph, Mt. Prospect, IL (US); Saji Radhakrishnan, Des Plaines, IL (US); Sanil Kumar Puthiyandyil, Schaumburg, IL (US); Rajesh Ramankutty, Schaumburg, IL (US)

(73) Assignee: UTStarcom, Inc., Alameda, CA (US)

( * ) Notice: Subject to any disclaimer, the term of this patent is extended or adjusted under 35 U.S.C. 154(b) by 883 days.

(21) Appl. No.: 09/796,162

(22) Filed: Feb. 28, 2001

(51) Int. Cl.[7] .................................................. G08C 15/00
(52) U.S. Cl. ...................... 370/217; 370/221; 370/352; 370/432; 714/4
(58) Field of Search ................................ 370/218, 216, 370/217, 219–221, 225, 432, 352; 714/4

(56) References Cited

U.S. PATENT DOCUMENTS

| 3,364,467 A | 1/1968 | Haibt et al. ...................... 714/4 |
| 4,160,127 A | 7/1979 | Slana et al. .................. 370/217 |
| 4,245,342 A | 1/1981 | Entenman .............. 340/825.01 |
| 4,412,323 A | 10/1983 | Abbott et al. ............... 370/217 |
| 4,623,883 A | 11/1986 | Konen .................. 340/825.01 |
| 4,633,246 A | 12/1986 | Jones et al. .................. 370/224 |
| 4,658,396 A | 4/1987 | Barden ....................... 370/221 |
| 4,740,954 A | 4/1988 | Cotton et al. ............... 370/408 |
| 4,984,240 A | 1/1991 | Keren-Zvi et al. ............. 714/4 |
| 5,014,261 A | 5/1991 | Shinbashi et al. .......... 370/220 |
| 5,132,962 A | 7/1992 | Hobgood et al. ........... 370/223 |
| 5,774,640 A | 6/1998 | Kurio ............................ 714/4 |
| 5,781,715 A | 7/1998 | Sheu ............................ 714/4 |
| 5,835,696 A | 11/1998 | Hess ........................... 714/10 |
| 5,959,972 A | 9/1999 | Hamami ..................... 370/228 |
| 6,032,266 A | 2/2000 | Ichinoche et al. ............. 714/9 |
| 6,052,733 A | 4/2000 | Mahalingam et al. ....... 709/235 |
| 6,078,590 A | 6/2000 | Farinacci et al. ........... 370/432 |
| 6,108,300 A | 8/2000 | Coile et al. .................. 370/217 |
| 6,178,455 B1 | 1/2001 | Schutte et al. .............. 709/228 |
| 6,359,858 B1 * | 3/2002 | Smith et al. ................. 370/217 |
| 6,603,757 B1 * | 8/2003 | Locascio .................... 370/352 |
| 2004/0100970 A1 * | 5/2004 | Gerdisch et al. ....... 370/395.53 |

FOREIGN PATENT DOCUMENTS

WO    WO 98/49620    * 11/1998

OTHER PUBLICATIONS

ABC's of Network Interface Cards (Internet Source) pp. 1-3 http://www.adaptec.com/worldwide/product/markeditorial.htm Feb. 21, 2001.
Hot-Standby 1+1 Redundancy (Internet Source) pp. 1-3 http://www.cisco.com/univercd/cc/td/doc/product/cable/cab_r_sw/hccpfeat.htm Feb. 5, 2001.

* cited by examiner

Primary Examiner—Seema S. Rao
Assistant Examiner—Robert C. Scheibel, Jr.
(74) Attorney, Agent, or Firm—McDonnell Boehnen Hulbert & Berghoff LLP

(57) ABSTRACT

A method for switching between a first network element and a second network element, the first and second network elements each connected to a first network and a second network. The method may be carried out by configuring the first network element and the second network element to recognize the same data from the second network. Next, data may be readdressed so that it may be recognized by both network elements. After readdressed data are sent to the first network element and the second network element, the first network element may be disconnected from the first network and the second network element may be connected to the first network. Data may be forwarded from the second network to the first network with little or no loss during the switchover.

20 Claims, 4 Drawing Sheets

METHOD FOR MODEM ELEMENT SWITCHOVER USING MULTICAST GROUPS

BACKGROUND OF THE INVENTION

1. Field of the Invention

The present invention relates generally to telecommunications and, more particularly, to any IP telecommunication technology, such as Voice over IP (VoIP) services.

2. Description of Related Art

As technology has advanced, making very high-speed computer networks widely available, it has become possible to use the networks for more diverse applications. Initially, the Internet was designed to carry data that were digital in nature, such as text files. With such digital files, Internet data transfers were satisfactory as long as the full file reached its destination in a reasonable time. Today, however, many new applications are placing real-time demands on the Internet. For example, when voice, music, video and still images are transferred, the timing of data arrival becomes crucial (or at least much more important) to the network's usefulness in carrying the information.

In addition to the timing of data arrival, lost information, in the form of dropped packets, is unacceptable to a business that wishes to provide its customers with Voice-over-IP (VoIP) or video-over-IP in competition with legacy suppliers of these services, such as local exchange carriers and cable television providers. The importance of satisfying the needs of bandwidth-hungry applications that are crucial to the business of providers (i.e., mission-critical applications) has given rise to QoS (Quality of Service) mechanisms or controls. QoS simply means that there is some quantifiable measure of the service being provided. For example, packet loss rate, a maximum delay rate, a guaranteed minimum bandwidth, or a maximum allowed bandwidth, etc., may be used to measure a network's QoS.

As high QoS becomes more important to customers, mission-critical network applications will require highly reliable connections between network elements. As discussed above, this high-connectivity reliability has a time critical element. That is, in the event of failure of a network element, the recovery mechanism must operate as seamlessly as possible. For example, for VoIP providers, if customers have the perception that voice quality is significantly lower than that of legacy providers (i.e., circuit-switched telephone companies), they may migrate back to those legacy providers.

It is known to those of ordinary skill in the art, of course, to switch a failed communications network element out of service and switch to a backup element (i.e., "switchover"). During the time between initial failure detection and switchover, information will be lost. Similarly, when the failed element recovers or is replaced, switching it back into service ("revertive switchover") may create a loss of information during the transition from the backup element. There are techniques for storing packets while failed elements are switched out and redundant elements are switched in, and then forwarding the stored packets to the redundant elements. However, such storing, copying, and forwarding of a copy of packets to all or multiple elements is not efficient, because a switch that stores, copies, and forwards packets will not be able to transfer data at wire speed. Further, such storing copying, and forwarding consumes processing and memory resources.

BRIEF SUMMARY OF THE INVENTION

A method and apparatus for switching between a first network element, such as a standby modem element, and a second network element, such as a main or active modem element, is disclosed. The first network element and the second network element may each be connected to a first network, such as the public switched telephone network or another network, and a second network, such as an Ethernet or another network. The method may be used in switching from a main to a standby element or in switching from a standby back to a main element. In other words, the first network element may be either a main or a standby modem element, and the second network element may also be either the main or the standby modem element.

The method may include configuring the standby modem element and the main modem element to recognize the same data from the second network. This may be accomplished by sending instructions via an Ethernet (either the second network mentioned above or a separate Ethernet) that cause both the standby and the active modem element to join a multicast group based on their media access control (MAC) addresses.

Next, data may be readdressed so that the standby modem element and the main modem element may recognize it. This may be done by, for example, rewriting the destination MAC addresses of incoming packets as multicast addresses that may be recognized and processed by both the standby and the active modem elements. After the data are readdressed, they may be sent to the standby modem element and the main modem element via the second network. If the second network is an Ethernet or another type of broadcast network, both modem elements can receive the data at the same time.

Once data are being sent simultaneously to both modem elements, the standby modem element can be disconnected from the PSTN. For example, an electromechanical relay or a solid-state relay may be used to physically disconnect the standby modem element's output from the PSTN. Alternatively, the "disconnecting" may be accomplished in software, where data to and from the PSTN are processed in parallel by both modem elements. If this method is used, switchover can be accomplished without any packet loss.

Next, the main modem element may be Connected to the PSTN. This step may be done either simultaneously with or very shortly after the standby modem element is disconnected, so that data may be forwarded from the second network to the first network with little or no loss during the switchover from the standby to the main modem element. One possible way to accomplish this would be to use different contacts of the same electromechanical relay that disconnects the standby modem element. If that method is used, the only interruption of data transfer during the switchover period will be during the short relay switching time. Alternatively, incoming and outgoing data may be processed in parallel by one or more modem elements so that "connecting" and "disconnecting" are conceptual, rather than physical, steps. As an example, data entering from the PSTN may be received by both modem elements but only forwarded onto the packet network from one of the modules. In this way, switchover may be accomplished with no loss of data.

The system for switching between network elements connected to a first network (which may be a PSTN) and a second network (which may be an Ethernet) may include various components, such as a configuring component that causes a first network element (e.g., standby modem element) and a second network element (e.g., main modem element) to recognize the same data sent via a second network. As an example, the configuring component may be a software routine and its associated hardware that resides in a host such as a route server connected via an Ethernet to the network elements. The route server may cause the main and standby modem elements to recognize the same data by sending them a command or commands that causes them to join a multicast group.

Another component of the system may be a readdressing component that readdresses data sent via the second network so that the standby modem element and the main modem element both recognize it. The readdressing component may, for example, be a software routine and its associated hardware in a switch egress module that communicates with the modem elements via one or more networks. The switch egress module and the route server may also be connected to each other via an Ethernet. The readdressing component may rewrite the MAC addresses of data packets that are forwarded to the modem elements. The MAC addresses may be rewritten as multicast MAC addresses so that both the standby and the main modem element will process the packets.

A sending component that sends the readdressed data to the at least one first network element and the at least one second network element via the second network may also be used. The sending component may also be software and associated hardware in the switch egress module that forwards packets to the modem elements via a network, such as an Ethernet network. A switching component that "disconnects" the standby modem element from the PSTN and "connects" the main modem element to the first PSTN may also be included in the system. The switching component may an electromechanical or a solid-state relay, or any other devices capable of connecting and disconnecting network elements. Alternatively the switching component may be a software implementation where data are made available to both the standby and main modem element but only processed by one module, so that a switchover may be made without any data loss.

This system permits data to be forwarded from the second network to the first network with little or no loss during the switchover from the standby modem element to the main modem element. As described above, the system may also be used to switchover from the main modem element to the standby modem element.

BRIEF DESCRIPTION OF THE SEVERAL VIEWS OF THE DRAWINGS

Exemplary embodiments of the present invention are described herein with reference to the drawings, in which.

DETAILED DESCRIPTION OF AN EXEMPLARY EMBODIMENT

1. Exemplary Architecture

Figure 1:
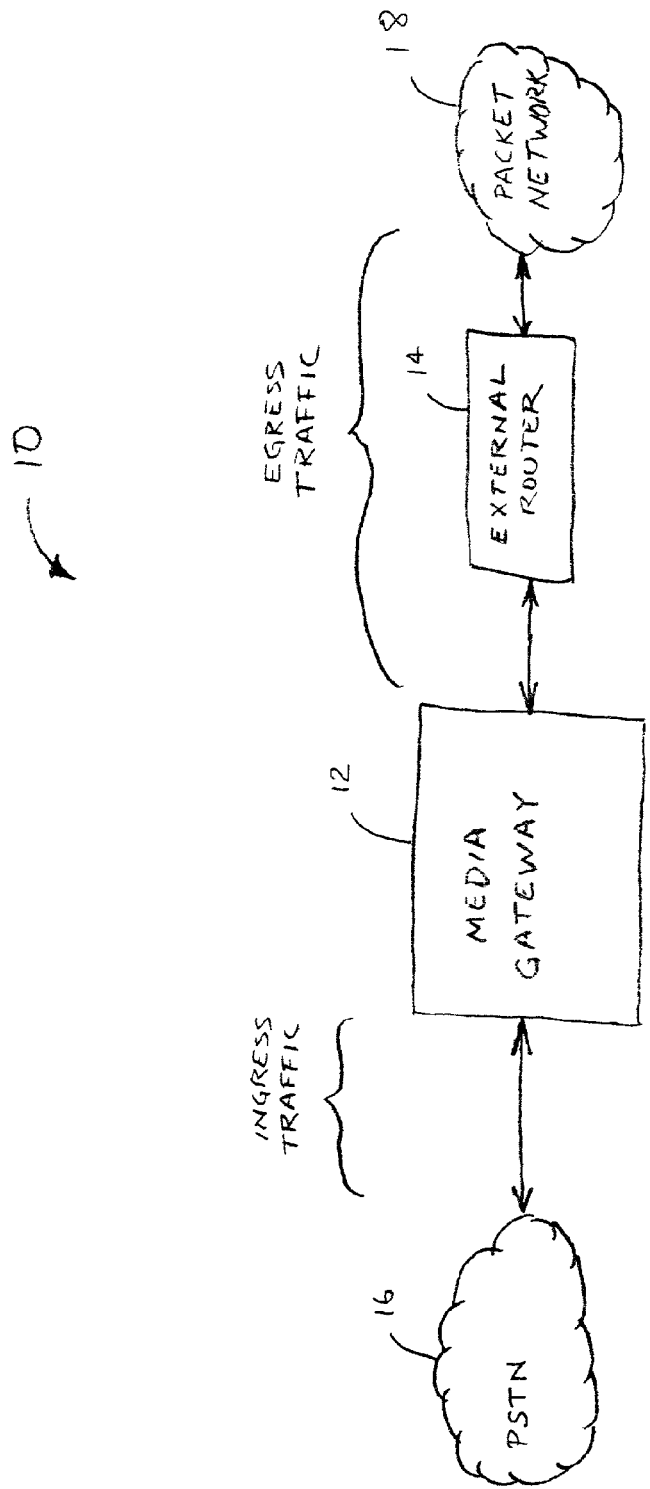
FIG. 1 is a simplified block diagram illustrating a system in which an exemplary embodiment of the present invention can be implemented.

Referring to the drawings, FIG. 1 illustrates a simplified block diagram of a system 10 in which an exemplary embodiment of the present invention may be employed. Specifically, FIG. 1 is an illustration of a voice over IP (VoIP) system. As shown in FIG. 1, system 10 includes a media gateway 12 interconnected to a PSTN 16 and, via an optional external router 14, to a packet network 18. Media gateway 12 serves as an interface between the PSTN and IP network, and it may typically digitize, encode, and compress originating voice traffic (i.e., ingress traffic) into packets for transport over managed IP networks. Media gateway 12 may also decompress, decode, and reassemble terminating voice traffic (i.e., egress traffic) for handoff to PSTN 16 via the local carrier's network. Media gateway 12 is a functional more than a physical entity, although it may be a standalone (physical) device. Media gateway 12's functionality may be provided, for example, by one or more shelves in a Total Control 2000 multimedia access platform, as produced by 3Com Corporation.

An object of the exemplary embodiment is to provide a switchover mechanism from a standby to a main modem element, or alternatively, from a main to a standby modem element. The switchover mechanism may be used to switch between any one of a number of main and standby modem elements. For example, the mechanism may be used for n+1 redundancy, where any of n main modem elements may be backed-up by one standby module. Alternatively, the mechanism may be used for 1+1 redundancy, where each main modem element is backed-up by one standby modem element. The mechanism may provide a loss-free or nearly loss-free transfer between modem elements or other network elements.

Figure 2:
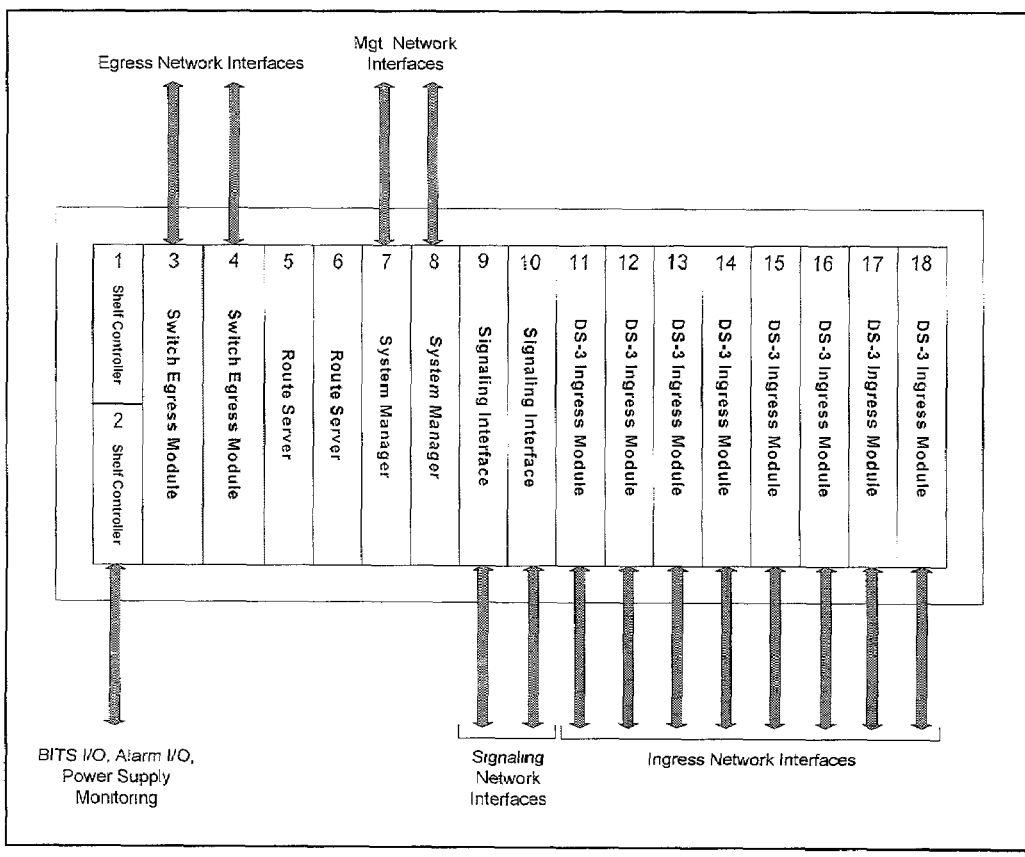
FIG. 2 is a simplified block diagram further illustrating an exemplary media gateway of the present invention.

The Total Control 2000 platform is highly scalable. In other words, it may comprise one or more control and/or data shelves that contain modem modules and other components of the system. For example, FIG. 2 illustrates a typical Total Control 2000 shelf configuration for VoIP. The shelf may be configured with eight DS-3 ingress modules (i.e., modem modules), two system manager modules, two route server modules, two switch egress modules (1+1 redundant), and two half-height shelf controllers. Using the switchover mechanism of the exemplary embodiment, any of the modem modules (or any modem elements within the modem modules) may serve as a main or standby element.

Figure 3:
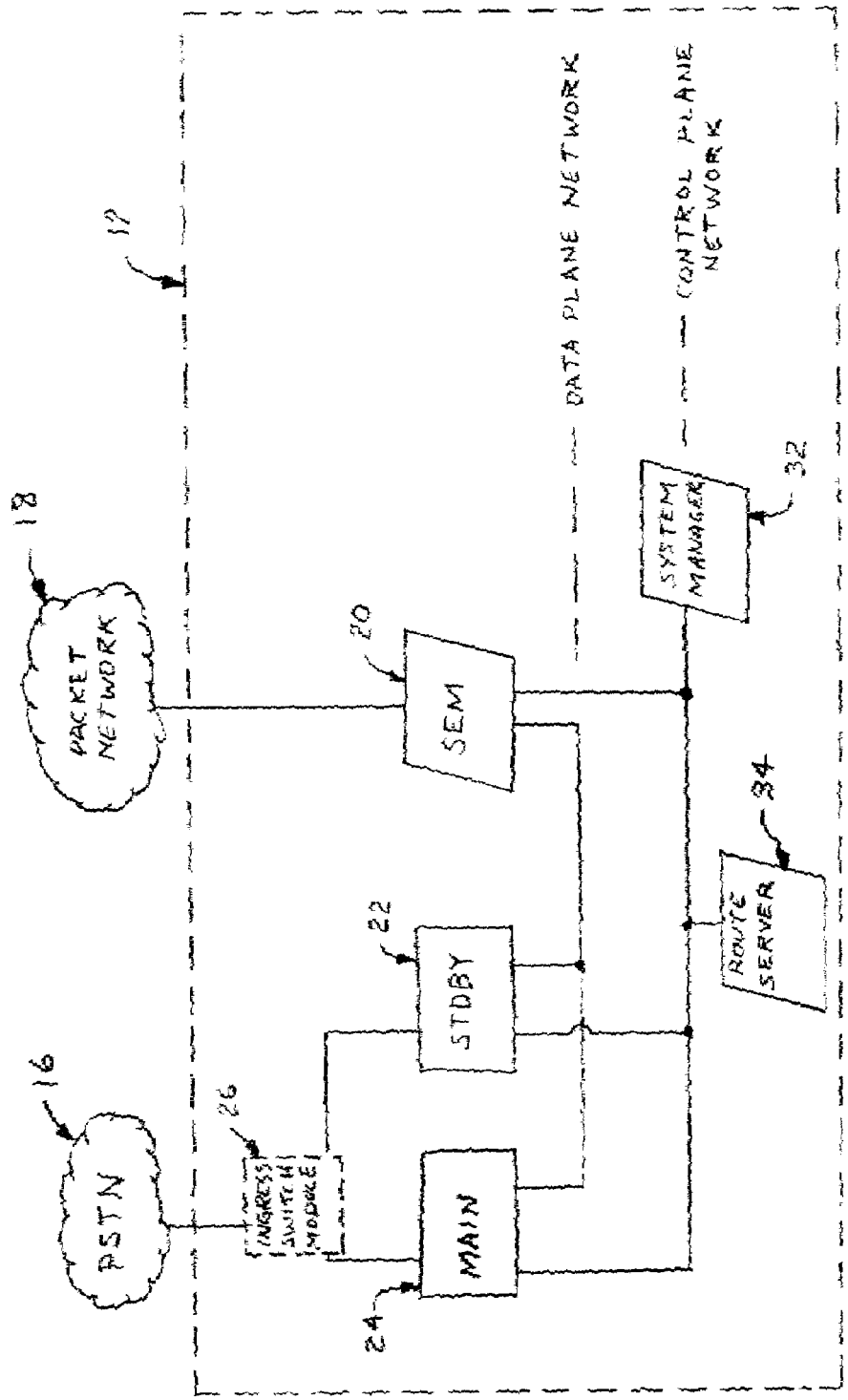
FIG. 3 is a simplified block further illustrating a system in which an exemplary embodiment of the present invention can be implemented.

For purposes of illustration, this description will focus on the operation of the switchover mechanism of just one main and one standby modem element. Such a simplified, exemplary embodiment of media gateway 12 is shown in FIG. 3. As shown in FIG. 3, the mechanism may be employed to provide for a fast transfer (i.e., a transfer during which little or no data are lost) from standby modem element 22 to main modem element 24. A modem element may be an entire modem module (i.e., a DS3 card) or it may be one of multiple modem control processors (MCPs) within a single DS3 card. The operation of the exemplary embodiment is the same regardless of the configuration. Further, those of ordinary skill in the art will understand that the connections shown need not be separate and distinct physical connections. For example, the data plane network and the control plane network may be logically distinct but share the same physical connections. Also, the connections from SEM 20, route server 34, and system manager 32 to main modem element 24 and standby modem element 22 may be as shown or may exist within a single DS3 card connected to SEM 20, route server 34, and system manager 32.

The exemplary mechanism can also operate regardless of the direction of data traffic at the time of switchover, but for purposes of illustration the mechanism will be described with reference to switchover of data flowing from packet network 18 to PSTN 16. Data flowing from packet network 18 (egress traffic) is first processed by switch egress module (SEM) 20. SEM 20 uses a network processor to rewrite packet addresses both on the egress to ingress traffic and on the ingress to egress traffic. This is done to support the hiding of internal IP networks within the shelf.

Next, egress data flowing from packet network 18 is forwarded to one or more modem elements, such as main modem element 24 and standby modem element 22. Which module will accept and process incoming data is controlled by route server 34 and system manager 32. Route server 34 controls the mapping of IP/Port address and the filter rules to be applied on those ports on SEM 20. Route server 34 also maintains a translation table and performs address translation and routing of data traffic.

Egress traffic is forwarded from SEM 20 to modem elements 22 and 24 via a data plane network, which may be an Ethernet network in accordance with IEEE 802.3. Further, SEM 20 and modem elements 22 and 24 may be controlled and monitored via a second Ethernet network, referred to as the control plane network. The control plane network may also be an Ethernet network in accordance with IEEE 802.3. Once egress traffic has been forwarded to modem elements 22 and 24, one or both modem elements may process it. After processing for eventual handoff to PSTN 16, the data are routed to PSTN 16 by a relay such as electromechanical relay 26 or via a software method as described above.

Those skilled in the art will appreciate that many of the elements described in this exemplary embodiment are functional entities that may be implemented as discrete components or in conjunction with other components, in any suitable combination and location.

2. Exemplary Operation

Figure 4:
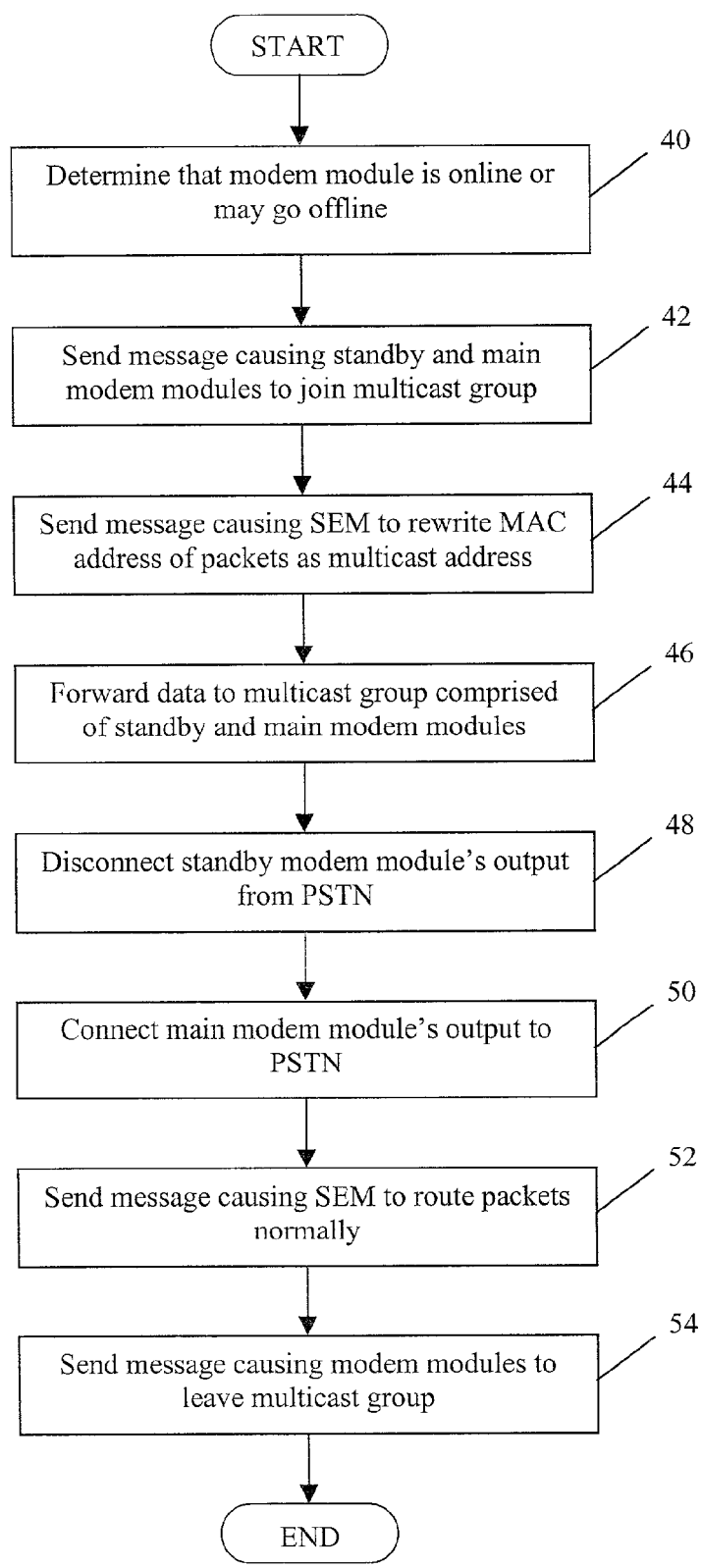
FIG. 4 is a flow chart illustrating the operation of an exemplary embodiment of the present invention.

FIG. 4 illustrates a set of functions that may be involved in an exemplary embodiment of the present invention where gateway 12 allows for a high-speed switchover from one modem element to another. The steps described below refer to the mechanism for a revertive switchover or, alternatively, a switchover in anticipation of a failure or overload condition on a modem element. A revertive switchover is a switchover that takes place after standby modem element 22 has been switched into service due to a failure of main modem element 24. Revertive switchover occurs once main modem element 24 is ready to come back online, either following its own recovery mechanism or after manual replacement.

Whether the switchover is revertive or in anticipation of an imminent failure or overload, the common characteristic of the switchover described below is that both modem elements are in operating condition at the time of the switchover. The switchover that occurs after an unanticipated failure uses the same basic methodology, but since one modem element has failed and some time, however short, must pass before a failure can be detected, some data may be lost during the switchover time.

As shown at step 40, one or more components, such as system manager 32, of media gateway 12, may detect that main modem element 24 has recovered or been replaced after standby modem element 22 has been online. In the case of an anticipated failure, the procedure would be the same except the switchover would be from main modem element 24 to standby modem element 22.

At step 42, the system manager 32 may cause route server 34 to send a control message to elements 22 and 24 that causes them to join a multicast group based on their MAC addresses. In media gateway 12, all modem elements (such as 22 and 24) have the same IP address. SEM 20 forwards packets to modem elements based on their MAC addresses, not their IP addresses. Ordinarily, SEM 20 forwards egress traffic to modem elements by rewriting the destination MAC address as a unicast address specific to the intended modem element. Then, the modem element with a permanent MAC address that matches that of unicast data will process and forward those data. Since Ethernet is a broadcast medium, however, any or all modem elements may process packets forwarded by SEM 20. Causing a network interface card (NIC) in each modem element to recognize a multicast MAC address in addition to its unique, permanent MAC address does this. Once this has been done, each modem element added to the multicast group (in this case, elements 22 and 24) will recognize packets addressed to the multicast group. In other words, both main modem element 24 and standby modem element 22 will recognize and process the same multicast packets at the same time.

FIG. 4 illustrates another part of this process. In order for elements 22 and 24 to recognize the same packets, they must have a multicast address. SEM 20 accomplishes this. As described above, SEM 20 ordinarily rewrites the destination MAC addresses (as unicast addresses) of egress traffic packets according to rules from route server 34, so that all the modem elements in media gateway 12 can share the load of egress traffic. Upon detection by system manager 32 that main modem element 24 is ready to come online, system manager 32 may cause route server 34 to command SEM 20, via the control plane network, to rewrite the MAC address of packets previously destined for standby element 22. SEM 20 can rewrite them as multicast addresses that will be recognized by both standby and main modem elements 22 and 24, respectively.

Now, when egress traffic is received from packet network 18, SEM 20 will immediately rewrite the address of those packets normally bound for standby modem element 22 to the multicast group comprising elements 22 and 24, and forward them accordingly, as shown at step 46. It may be recognized that this can be done at wire speed—that is, without receiving, storing and forwarding data in SEM 20.

As illustrated by step 48, the output of standby modem element 22 may be disconnected from PSTN 16 by ingress switch module 26. In some cases, the output may not be physically disconnected from PSTN 16. For example, if only a portion of a modem module failed and is to return to service, the functionality of ingress switch module 26 may be performed by a time slot interchange (TSI) that is resident in each modem module. Specifically, each modem module may have multiple modem control processors (MCPs), each capable of handling a portion of a DS3. Additionally, each modem module may have a standby MCP. If a modem module has one standby MCP for every 7 main MCPs, the module has 7+1 redundancy. If only one MCP is being brought online after a standby MCP has been online in its place, the TSI may accomplish the routing of data without any loss, since both the main and the standby MCPs may recognize and process the data simultaneously.

If, on the other hand, an electromechanical relay is used as ingress switch module 26 (e.g., when an entire modem module has failed), another of its contacts may also be used to connect main modem element 24 to PSTN 16. In this way, the only data interruption that will occur during the switchover will be due to the short switching delay of relay 26. Those of ordinary skill in the art will realize that such a short switching delay (e.g., possibly in the millisecond range) may be accomplished without an audible effect on any VoIP communications in progress at the time of switchover. For purposes of illustration, relay 26 is shown as switching only one conductor, but it may in fact switch any number of conductors simultaneously.

Further, it is not critical to the present invention that relay 26 be an electromechanical relay. For example, the function of relay 26 may be accomplished by a solid-state relay or even by hardware and/or software that is capable of enabling or disabling the outputs of modem elements 22 and 24. In the exemplary embodiment, media gateway 12 may be equipped with multiple relays or equivalent mechanisms wired as shown in FIG. 3 so that standby modem element 22 may be switched in or out of service in association with any of the n modules for which it is a backup.

As described above, the output of main modem element 24 may be switched onto PSTN 16 simultaneously or nearly simultaneously with the disconnection of standby modem element 22 (step 48), as shown at step 50. Once the switchover is complete, system manager 32 may cause route server 34 to send a control message to SEM 20 via the control plane network commanding it to resume rewriting the destination MAC addresses of egress traffic packets as unicast MAC addresses for main modem element 24 (step 52). At step 54, the route server may send a message via the control plane network to the main and standby modem elements that causes them to leave the multicast group and revert to unicast operation.

Those of ordinary skill in the art will recognize that the order of execution of many of the foregoing steps is not necessarily critical to the functioning of the invention. Exemplary embodiments of the present invention have been illustrated and described. It will be understood, however, that changes and modifications may be made to the invention without deviating from the spirit and scope of the invention, as defined by the following claims.

We claim:

1. A method for switching between at least one first network element and at least one second network element, the first and second network elements each connected to a first network and a second network, the method comprising:
   configuring the at least one first network element and the at least one second network element to recognize data from the second network;
   readdressing the data so that it is recognizable by the at least one first network element and the at least one second network element, wherein readdressing the data is accomplished by rewriting a MAC address of data as a multicast address;
   sending the readdressed data to the at least one first network element and the at least one second network element via the second network;
   performing a switchover by (i) disconnecting the at least one first network element from the first network, and (ii) connecting the at least one second network element to the first network;
   whereby the data may be forwarded from the second network to the first network with no loss of data during the switchover from the at least one first network element to the at least one second network element.

2. The method of claim 1, wherein the at least one first network element and the at least one second network elements are selected from a group consisting of a main network element and a standby network element.

3. The method of claim 2, wherein the main and the standby network elements are main and standby modem elements.

4. The method of claim 1, wherein configuring the at least one first network element and the at least one second network element to recognize the data from the second network is accomplished by causing the at least one first network element and the at least one second network element to join a multicast group.

5. The method of claim 4, wherein readdressing the data is accomplished by rewriting a MAC address of data as a multicast address.

6. The method of claim 3, wherein configuring the main modem element and the standby modem element is accomplished by causing the main modem element and the standby modem element to join a multicast group.

7. The method of claim 6, wherein readdressing the data is accomplished by rewriting a MAC address of data as a multicast address.

8. The method of claim 4, wherein the at least one first network element and the at least one second network element each recognize the readdressed data by recognizing the multicast address.

9. The method of claim 1 wherein the first network is a public switched telephone network and the second network is a packet network.

10. The method of claim 9 wherein the packet network is an Ethernet network.

11. A system for switching between at least one first network element and at least one second network element, the at least one first and at least one second network elements each having at least one first data interface connected to a first network and at least one second data interface connected to a second network, the system comprising:
    at least one first network element;
    at least one second network element;
    a configuring component that configures the at least one first network element and the at least one second network element to recognize data from the second network;
    a readdressing component that readdresses the data sent via the at least one second network so that it is recognizable by the at least one first network element and the at least one second network element, wherein readdressing the data is accomplished by rewriting a MAC address of data as a multicast address;
    a sending component that sends the readdressed data to the at least one first network element and the at least one second network element via the second network; and
    a switching component that disconnects the at least one first network element from the first network and connects the at least one second network element to the first network, to perform a switchover;
    whereby the data may be forwarded from the second network to the first network with no loss of data during the switchover from the at least one first network element to the at least one second network element.

12. The system of claim 11, wherein the at least one first network element and the at least one second network element are selected from a group consisting of a main network element and a standby network element.

13. The system of claim 12, wherein the main and the standby network elements are main and standby modem elements.

14. The system of claim 11, wherein configuring the at least one first network element and the at least one second network element to recognize the data from the second network is accomplished by causing the at least one first network element and the at least one second network element to join a multicast group.

15. The system of claim 14, wherein readdressing the data is accomplished by rewriting a MAC address of data as a multicast address.

16. The system of claim 13, wherein configuring the main modem element and the standby modem element is accomplished by causing the main modem element and the standby modem element to join a multicast group.

17. The system of claim 16, wherein readdressing the data is accomplished by rewriting a MAC address of data as multicast address.

18. The system of claim 14, wherein the at least one first network element and the at least one second network element each recognize the readdressed data by recognizing the multicast address.

19. The system of claim 11 wherein the first network is a public switched telephone network and the second network is a packet network.

20. The system of claim 19 wherein the packet network is a Ethernet network.

* * * * *